United States Patent

Messina et al.

[15] 3,640,859
[45] Feb. 8, 1972

[54] GREASE COMPOSITIONS

[72] Inventors: Joseph F. Messina, Delaware; Henry Gisser, Philadelphia, both of Pa.

[73] Assignee: The United States of America as represented by the Secretary of the Army

[22] Filed: Sept. 24, 1969

[21] Appl. No.: 860,801

[52] U.S. Cl. .................................252/54, 252/58
[51] Int. Cl. ..........................................C10m 7/28
[58] Field of Search ...............................252/58, 54

[56] References Cited

UNITED STATES PATENTS

| | | | |
|---|---|---|---|
| 3,258,425 | 6/1966 | Burke | 252/58 |
| 3,262,879 | 7/1966 | Messina | 252/58 |
| 3,453,210 | 7/1969 | Wright | 252/58 |

*Primary Examiner*—Daniel E. Wyman
*Assistant Examiner*—I. Vaughn
*Attorney*—Harry M. Saragovitz, Edward J. Kelly, Herbert Berl and S. Dubroff

[57] ABSTRACT

Stable grease compositions having excellent extreme pressure properties, among other, the grease consisting of about 68–73.5 weight percent bis(m-phenoxyphenyl) ether having a pour point of +4.5° C., balance being tetrafluoroethylene polymer having a molecular weight 10,000–50,000, softening point 321.1° C., particle size less than 30 microns in diameter, and supplied as a 7.5 percent suspension is trichlorotrifluoroethane.

4 Claims, No Drawings

GREASE COMPOSITIONS

The invention described herein may be manufactured, used and licensed by or for the Government for governmental purposes without the payment to us of any royalty thereon.

This invention relates to improved lubricants and more particularly concerns grease compositions having good extreme pressure properties, the greases being chemically and physically stable.

It is an object of the invention to provide improved grease compositions having good extreme pressure properties.

Another object of the invention is to provide grease compositions which exhibit shear stability, low-fluid separation, high-dropping point, and good oxidation stability.

Other objects and features of the invention will become apparent as the invention is more fully hereinafter disclosed.

Briefly, we have discovered new grease compositions especially useful to the military wherein a polyphenyl ether is thickened with a perfluoro polymer.

More specifically, we have discovered that bis(m-phenoxyphenyl) ether may be thickened with tetrafluoroethylene polymer (hereinafter referred to as PTFE) having a molecular weight of about 10,000–50,000 to produce a stable, grease-type lubricant for military applications, among others.

Typical properties of the PTFE solids used in the preparation of our inventive compositions are: a softening point of 321.1° C., a particle size under 30 microns in diameter, the PTFE solids being supplied as a 7.5 percent suspension in trichlorotrifluoroethane.

The viscosity of the ether, determined at 37.78° C., is 75.1 centistokes.

The grease was prepared as follows:

A dispersion of PTFE in trichlorotrifluoroethane was heated on a steam bath until 50–75 percent of the solvent evaporated. Approximately 75 percent of the required quantity of bis(m-phenoxyphenyl) ether was then added, the mixture was stirred and heating continued until all the trichlorotrifluoroethane had evaporated. The trichlorotrifluoroethane was analyzed by gas chromatography using the following technique. A sample of the grease mixture was eluted using C.P. benzene. The eluted fluid mixture was placed in a gas chromatograph with a 20 feet carbowax 20 M column at 50 C. and a helium gas flow of 10 ml. per minute. Absence of a retention peak after 3.3 minutes indicated that all of the trichlorotrifluoroethane had evaporated. The remainder of the fluid was then added while stirring, and stirring continued until a homogeneous greaselike product was obtained. The mixture was cooled to room temperature and passed through a colloid mill with the stator-to-rotor clearance set at 0.001 in. The homogenized mixture was then placed in a freezer at −10° C. for 24 hours prior to use. At least two batches of each grease were prepared. The thickener content was determined in duplicate on each batch using a Soxhlet extractor and benzene. The data are presented in Table I below:

TABLE I

GREASE COMPOSITION

| Base Fluid | | | PTFE Thickener | |
|---|---|---|---|---|
| Name | wt. % | Pour Point | wt. % |
| Bis(m-phenoxyphenyl) ether | 73.5 | +4.5° C. | 26.5 |

The PTFE thickener content above represents a minimum concentration necessary to provide a stable greaselike structure. If less than the amount is used, a semifluid consistency usually results. The effective range of the ether fluid falls between about 68 to 73.5 weight percent.

Shear stability tests were run using the one-quarter scale (ASTM D 1403–62) grease worker modified to permit automatic operation. The values in Table II below represent double strokes, and show, after 100,000 double strokes, the change in consistency to be 73 units (1 unit=one-tenth of a millimeter). After 6 months storage, the change is worked consistency on the stored sample was not significantly different than the change on the unstored sample (42). The table below indicates that the bis(m-phenoxyphenyl)ether-PTFE thickened grease was shear stable, and that this property would not change significantly with time.

TABLE II

| SHEAR STABILITY STROKES | | | |
|---|---|---|---|
| 0* | 500 | 10,000 | 100,000 |
| 286(297)** | 290(298) | 311(309) | 359(339) |

*Unworked, no strokes

**Data in parenthesis are values obtained after six month's storage.

In comparison therewith, prototype grease composition used currently by all military services of the United States Government, other than for chassis lubrication, is a diester mixture base grease including additives and lithium hydroxystearate, MIL–G–23827A, Aug. 1, 1965, and yielded 270 units at 0 strokes and 375 units at 100,000 strokes, a difference of 105, or considerably poorer than our inventive compositions.

Fluid separation was low. Laboratory valves in Table III below were corroborated by visual observations on test samples stored in the laboratory from 6 to 12 months. No bleeding was noted.

TABLE III

| Fluid Separation and Dropping Point | |
|---|---|
| Bleeding, wt. %* | Dropping Point, °C.** |
| 0.0 | 299.0 |

*Fed. Std. Test Method 321.2 (Fed. Std. Test Method 791b, 1966), 100°C. for 30 hours.

**ASTM D 2265–67.

Our grease exhibited a very high-dropping point (temperature at which the first drop of material falls from the cup), a property useful for high-temperature applications.

In comparison therewith, the grease defined by MIL–G–23827A, hereinabove referred to, yielded 5.0 weight percent bleeding and a dropping point of about 163°C., much inferior to our grease composition.

TABLE IV

| Extreme Pressure Properties | |
|---|---|
| Seizure load, kg$^a$ | Weld load, kg$^a$ |
| 100 | 340 | a-Four-Ball Extreme Pressure Tester

The Four-Ball EP Tester determines loads at incipient seizure and at weld. Incipient seizure is defined as the load at which a sudden sizeable increase in wear scar diameter occurs, and weld is the load at which motion of the upper rotating ball in relation to the other three is no longer possible. The data in Table IV above show good extreme pressure properties (seizure and weld loads) when compared to MIL–G–23827A grease, hereinabove referred to, which has a seizure load of 90 kg. and a weld load of 190 kg., the latter being substantially below that of our composition.

It should be borne in mind that no extreme pressure additives are used in our improved grease compositions.

The data in Table V below show the vastly superior oxidation stability of our grease having no oxidation inhibitor added when compared to grease 23827 (MIL-G-23827A, Aug. 1, 1965) which grease requires the presence of an oxidation inhibitor:

TABLE V

| GREASE | OXIDATION STABILITY*<br>Pressure Drop (lb./sq. in.) |
|---|---|
| Inventive Composition | 1.0 |
| 23827 | 10.0 |

*ASTM D 942-50 (100 hours at 121.2° C.).

We wish it to be understood that we do not desire to be limited to the exact details described, for obvious modifications will occur to a person skilled in the art.

We claim:

1. A homogeneous grease composition comprising a major proportion of bis(m-phenoxyphenyl) ether having a pour point of about 4.5° C. and a thickening amount of tetrafluoroethylene polymer.

2. The composition of claim 1 wherein said polymer has a molecular weight between about 10,000 to 50,000 and a particle size less than about 30 microns in diameter.

3. The composition of claim 1 wherein said bis(m-phenoxyphenyl) ether comprises about 68 to 73.5 weight percent of said grease composition, the balance being substantially tetrafluoroethylene polymer having a molecular weight between about 10,000 to 50,000 and a particle size less than about 30 microns in diameter.

4. A homogeneous grease composition exhibiting good extreme pressure properties, good shear stability, low-fluid separation, high-dropping point and good oxidation stability consisting essentially of about 73.5 weight percent bis(m-phenoxyphenyl) ether having a pour point of about 4.5° C. and tetrafluoroethylene polymer having a molecular weight ranging between about 10,000 to 50,000 and a particle size of less than 30 microns in diameter.

* * * * *